April 23, 1940.         K. F. LEAMAN         2,198,288
                          DRILL GUIDE
                       Filed May 28, 1938
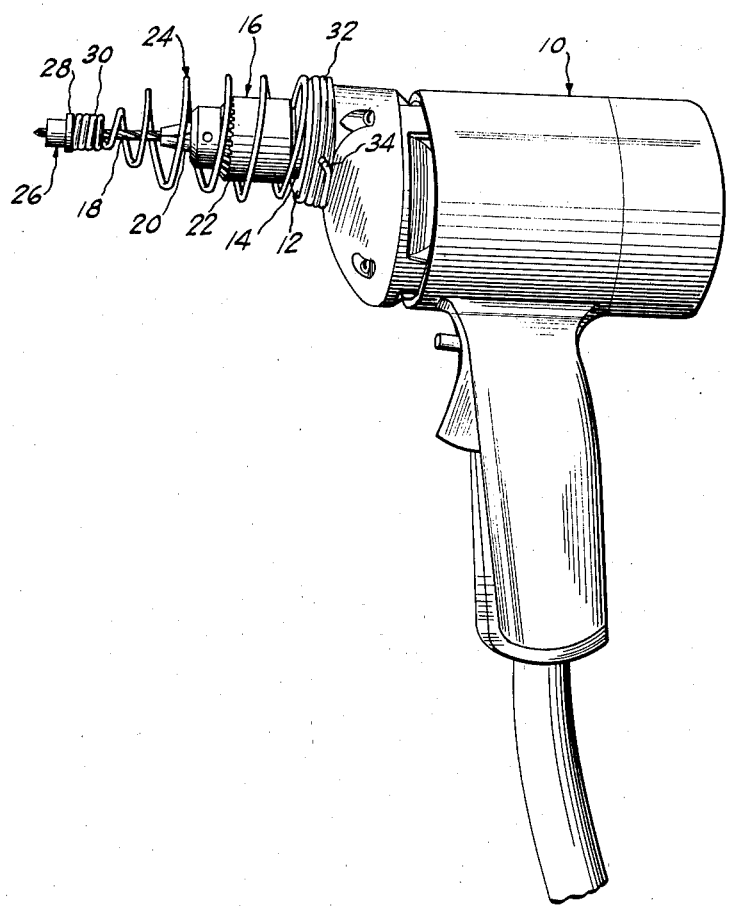
INVENTOR.
Kenneth F. Leaman
BY Harris G. Luther
         ATTORNEY Patented Apr. 23, 1940

2,198,288

UNITED STATES PATENT OFFICE 2,198,288

DRILL GUIDE

Kenneth F. Leaman, Manchester, Conn., assignor to United Aircraft Corporation, East Hartford, Conn., a corporation of Delaware Application May 28, 1938, Serial No. 210,658

4 Claims. (Cl. 77—55)

This invention relates to improvements in drill guides and has for an object the provision of an improved and simplified device for guiding and centering a drill bit.

A further object resides in the provision of a device of the character specified which is readily adaptable to various makes of hand drills without necessitating any change or modification of the drill.

A still further object resides in the provision of a device of the character specified which is fully effective for its intended purpose and at the same time is simple and economical to make and is readily replaceable.

Other objects and advantages will be more particularly pointed out hereinafter or will become apparent as the description proceeds.

In the accompanying drawing there is illustrated by way of example a particular constructional form of the device of the invention. The drawing, however, is for the purpose of illustration only and is not to be taken as limiting or restricting the invention as set forth in the appended claims.

In the drawing the single figure is an elevational view of a conventional form of electric drill and drill bit with a drill guide or centering device constructed according to the invention applied thereto.

Referring to the drawing in detail the drill generally indicated at 10 is provided with a boss 12 through which extends the shaft 14 carrying the chuck generally indicated at 16. The chuck 16 receives one end of the drill bit 18 in the chuck jaws 20 which are clamped upon the bit by operation of the chuck screw 22. As these parts are all conventional it is thought that a further description is not necessary for the purpose of this disclosure.

The improved drill guide comprises two elements, namely, a helical spring generally indicated at 24 and an apertured spool or bushing generally indicated at 26. The bushing is preferably made of a hard material such as drill steel and is provided with an axial bore dimensioned to receive the bit 18 for free rotation therein. Intermediate in its length the substantially cylindrical spool 26 is provided with an external radial flange or shoulder 28. Upon one side of this shoulder the spool is externally dimensioned to fit in the guide holes in a drill jig and upon the other side is externally dimensioned to fit tightly in a close coil or loop 30 provided at the small end of the helical spring 24. At its large end the helical spring 24 is provided with a coil or loop 32 dimensioned to fit snugly upon the boss 12, although this dimension may be readily changed to accommodate the loop size to bosses of slightly different dimension. The drill guide may be removed from the drill by applying pressure to the bent up end 34 of the spring in a direction to uncoil the loop 32 and by them slipping the loose loop off of the boss.

In operation the outer end of the spool 26 may be inserted in the guide hole in the drilling jig to center the drill and as the drill progresses through the work piece the bit will move through the spool compressing the spring 24. When the drill is removed from the work piece the spring will return the guide spool to its original position.

While a particular constructional form of the device has been illustrated and described for the purpose of disclosing the invention it is to be understood that the invention is not limited to the particular form so illustrated and described but that such changes in the size, shape and arrangement of parts may be resorted to as come within the scope of the sub-joined claims.

Having now described the invention so that others skilled in the art may clearly understand the same, what is claimed and what it is desired to secure by Letters Patent is as follows:

1. A drill guide comprising an apertured bit receiving spool, and a helical spring having a loop at one end for receiving said spool and an adjustable loop at the opposite end for connection to a drill chuck bearing boss.

2. A drill guide comprising an apertured bit receiving spool, and a helical spring having a loop at one end for receiving said spool and an adjustable loop at the opposite end for connection to a drill chuck bearing boss, said spring having diametrical dimensions such that it surrounds the chuck and is spaced therefrom, and a length such that the spool is normally positioned adjacent to the pointed end of the drill bit.

3. A drill bit centering device comprising an apertured bit receiving spool provided intermediate its length with an external annular shoulder, and a helical spring having at its small end a loop for receiving the portion of said spool on one side of said shoulder and at its large end a loop for supporting said centering device on a drill chuck bearing boss.

4. A drill bit centering device comprising an apertured bit receiving spool provided intermediate its length with an external annular shoulder, and a helical spring having at its small end a loop for receiving the portion of said spool on one side of said shoulder and at its large end a loop for supporting said centering device on a drill chuck bearing boss, the portion of said spool on the opposite side of said shoulder from said loop received portion being dimensioned for insertion into the guide holes of a drilling jig.

KENNETH F. LEAMAN.